June 27, 1961 W. G. LUNDQUIST 2,990,108
COMPRESSOR WITH ANNULAR DISCHARGE DIFFUSER
Filed March 4, 1957
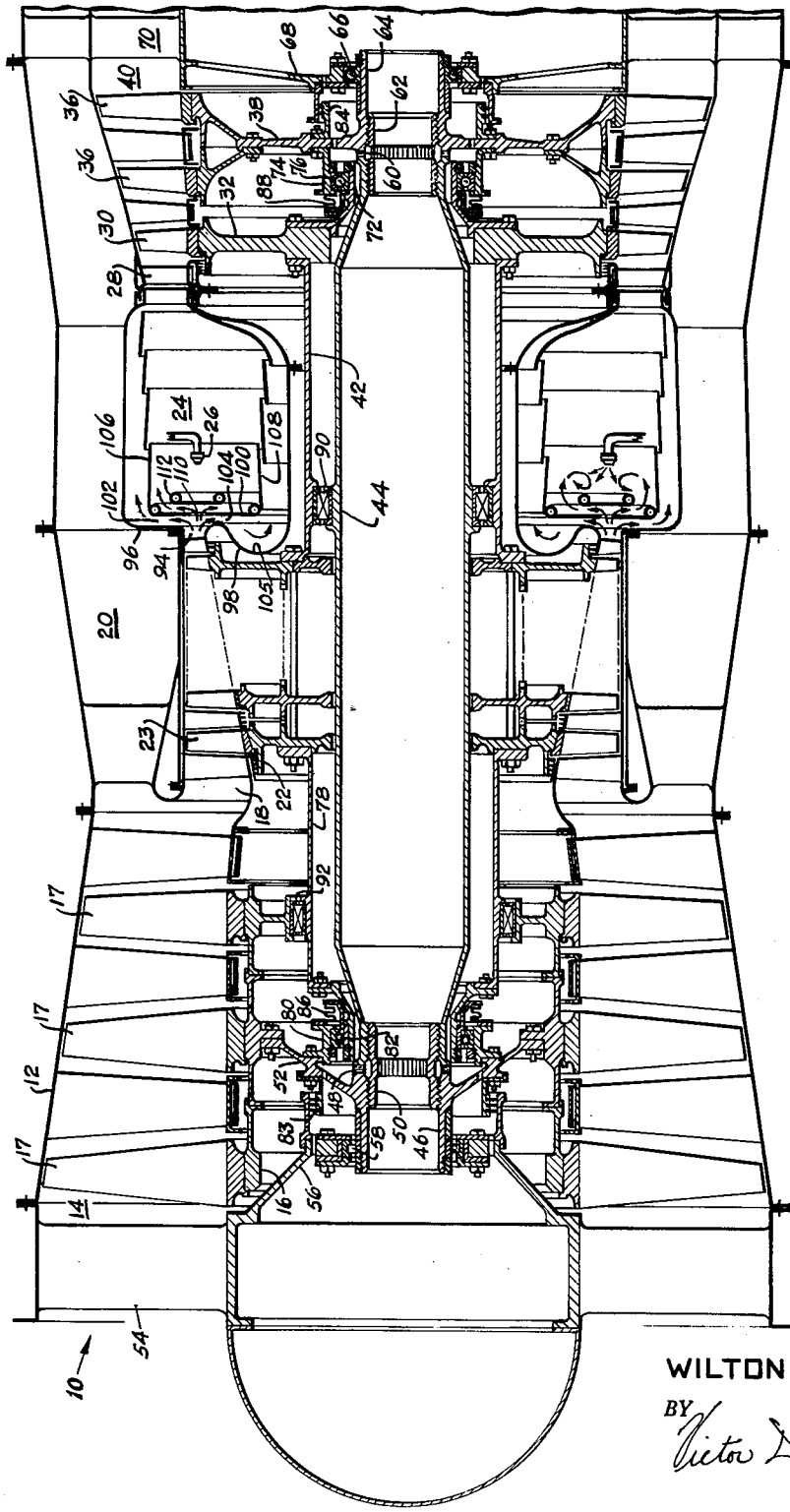
INVENTOR.
WILTON G. LUNDQUIST
BY
ATTORNEY ये
United States Patent Office 2,990,108
Patented June 27, 1961

2,990,108
COMPRESSOR WITH ANNULAR DISCHARGE DIFFUSER
Wilton G. Lundquist, Ho-Ho-Kus, N.J., assignor to Curtiss-Wright Corporation, a corporation of Delaware
Filed Mar. 4, 1957, Ser. No. 643,698
2 Claims. (Cl. 230—132)

This invention relates to gas turbine engines and is particularly directed to such engines designed to provide an engine of minimum length.

A two-spool gas turbine engine is one having two turbine and compressor rotor assemblies with the shaft connecting the turbine and compressor of one assembly extending co-axially through the other. An object of the present invention comprises the provision of a novel and simple bearing support arrangement for the two rotor assemblies of such an engine whereby a short engine length is achieved.

A further object of the invention comprises the provision of a gas turbine engine having a novel combustion chamber inlet construction so as to effect a reduction in the overall length of the engine.

Other objects of the invention will become apparent in connection with the drawing which comprises a schematic axial sectional view through a gas turbine engine embodying the invention.

Referring to the drawing, there is illustrated a turbo-fan type two-spool engine 10 comprising a duct-like housing 12 having an air entrance passage 14. A low pressure compressor 16 having rotor blades 17 extending across the passage 14 is journaled in the housing 12. The compressor 16 compresses air from the air entrance passage 14 and supplies this compressed air to two co-axial passages 18 and 20 disposed in parallel relation.

A high pressure compressor 22 is journaled within the engine housing 12, said compressor having rotor blades 23 extending across the passage 18 to further compress and supply this air to the engine combustion chamber 24. Fuel is supplied to the combustion chamber 24 through nozzles 26. From the combustion chamber the gases are directed by a nozzle or guide vane structure 28 to the blades 30 of a high pressure turbine rotor 32 for driving said rotor. From the high pressure turbine blades 30 the combustion gases or turbine motive fluid is directed to the blades 36 of a low pressure turbine rotor 38 for driving said latter rotor. From the low pressure turbine rotor blades 36 the hot exhaust gases discharge through an exhaust passage 40 and thence through a nozzle (not shown) into the surrounding atmosphere.

The air supplied to the passage 20 in effect by-passes the high pressure compressor 22, combustion chamber 24 and turbines 32 and 38. This by-pass air may discharge into the surrounding atmosphere through a nozzle (not shown) at the discharge end of the passage 20 or said air may first be mixed with the hot exhaust gases from the low pressure turbine 38 and then said mixture discharged into the surrounding atmosphere through a common exhaust nozzle.

The high pressure turbine rotor is drivably connected by a hollow shaft 42 to the rotor of the high pressure compressor 22. The low pressure turbine rotor 38 is drivably connected to the rotor of the low pressure compressor 16 by a shaft 44 which extends co-axially through the hollow shaft 42.

The structure of the engine 10 so far described is that of a conventional turbo-fan engine.

With the structure so far described, the low pressure compressor 16, low pressure turbine 38 and interconnecting shaft 44 constitute a first or low pressure rotor assembly and the high pressure compressor 22, high pressure turbine 32 and interconnecting shaft 42 constitute a second or high pressure rotor assembly. The ends of the low pressure rotor assembly project beyond the ends of the high pressure rotor assembly and said low pressure rotor is provided with a bearing support at each end. Thus the shaft 44 has a forward end extension 46, said extension being splined to the main portion of the shaft 44 at 48 and is secured thereto by a threaded member 50. An annular flange 52 on the shaft extension 46 is drivably connected to an intermediate rotor stage of the low pressure compressor 16. Thus as illustrated, the low pressure compressor has three stages and the shaft flange 52 is secured to the middle rotor stage.

A plurality of circumferentially-spaced struts 54 extend radially across the air entrance passage 14 to connect a rotor supporting structure 56 to the housing 12, said support structure being disposed immediately upstream of the adjacent compressor end of the low pressure rotor assembly. The forward end 46 of the shaft 44 is journaled in a bearing 58 carried by the supporting structure 56 whereby the compressor end of the low pressure rotor assembly is supported from the housing 12 by the bearing 58 and support structure 56.

The rear end of the shaft 44 is splined to the low pressure turbine 38 at 60 and is secured thereby by a threaded member 62. The low pressure turbine 38 has a rearward shaft-like extension 64 which is journaled in a bearing 66 carried by a rotor supporting structure 68, said supporting structure being disposed immediately downstream of the adjacent turbine end of the low pressure rotor assembly. The supporting structure 68 is connected to the housing 12 by circumferentially-spaced struts 70 extending radially across the exhaust passage 40 and the by-pass passage 20. In this way the turbine end of the low pressure rotor assembly is supported from the housing 12 by the bearing 66 and supporting structure 68.

With the rotor supporting structure described, the low pressure rotor assembly is supported by bearings 58 and 66 at its two ends which in turn are supported in the housing 12 by the bearing support structures 56 and 68. The high pressure rotor assembly is supported by bearings at its two ends on the low speed rotor assembly whereby the bearings 58 and 66 and the bearing support structures 56 and 68 also support the high pressure rotor assembly. For this purpose, the high pressure turbine 32 has an annular rearward extension 72, the low pressure turbine 38 has an overlapping forward annular extension 74 and a bearing 76 is disposed between said extensions 72 and 74. In this way the turbine end of the high pressure rotor assembly is journaled on the low pressure turbine rotor extension 74 and therefore is supported from the housing 12 by the adjacent bearing 66 and bearing support structure 68.

Similarly the high pressure compressor 22 has an annular forward extension 78, the low pressure compressor 16 has an overlapping annular rearward extension 80 and a bearing 82 is disposed between said extensions 78 and 80. Hence the compressor end of the high pressure rotor assembly is journaled on the low pressure compressor extension 80 and therefore is supported from the housing 12 by the adjacent bearing 58 and bearing support structure 56.

The extensions 72 and 78 of the high pressure rotor assembly are provided to place the bearings 76 and 82 close to the bearings 66 and 58 respectively and their bearing support structures 68 and 56 to minimize bending loads on the low pressure rotor shaft 44.

The bearing support structures 56 and 68 are disposed immediately beyond their respective adjacent ends of the low pressure rotor assembly and their bearings 58 and 66 are disposed adjacent the ends of said rotor assembly. This makes it simple to supply lubricating oil to the bearings 58 and 66 from beyond the ends of the low pressure rotor assembly. An annular seal 83 is provided between the bearing support 56 outwardly of the bearing 58 and the shaft flange 52 to prevent leakage of lubricating oil into the compressor air flow path from the back side of the bearing 58. Likewise an annular seal 84 is provided between the bearing support 68 outwardly of the bearing 66 and the low pressure turbine rotor 38 to prevent leakage of lubricating oil into the turbine motive fluid from the front side of the bearing 66.

Lubricating oil can be supplied to the bearings 76 and 82 from within the shaft 44 to the front side of the bearing 82 and to the rear side of the bearing 76. An annular face seal 86 is provided between the shaft flange 52 and the shaft extension 78 to prevent leakage of oil from the rear side of the bearing 82 into the compressed air discharge of the compressor 16. Similarly an annular face seal 88 is provided between the low pressure rotor extension 74 and the high pressure rotor extension 72 to prevent leakage of lubricating oil into the turbine motive fluid between the low and high pressure turbine from the front side of the bearing 76.

The bearings 58, 66, 76 and 82 are the only bearings required for the support of the two rotor assemblies and the entire load is transmitted to the engine housing 12 through the two bearing supports 56 and 68 disposed beyond the ends of the two rotor assemblies. With this construction, no rotor supporting structure is required to extend across the flow path of the engine fluid between the ends of the rotor assemblies, for example between the low and high pressure compressors. The absence of any such intermediate bearing supporting structure results in a materially shorter engine than would otherwise be possible.

It is recognized that in certain engine sizes it may be desirable to provide means between the two rotor assemblies to damp lateral vibrations of the shafts 42 and/or 44. Such a means is schematically indicated at 90 and 92 or such damping means may be incorporated in any of the bearings 58, 66, 76 and 82. Patent No. 2,631,901 is an example of a suitable form of means for damping lateral shaft vibrations.

It should also be noted that with the aforedescribed structure the seals 83, 84, 86 and 88 are the only rotating lubricating oil seals required for the two rotor assemblies.

The engine 10 has been illustrated and described as a turbo-fan type two-spool gas turbine engine. It will be obvious, however, that the two rotor support structure described can be used with other types of two-spool gas turbine engines.

In the conventional gas turbine engines, the air passage between the compressor outlet and the combustion chamber is of substantial axial length and progressively increases in cross-sectional area to function as a diffuser passage for converting the velocity head of the air leaving the compressor into pressure before said air enters the combustion chamber. With this conventional diffuser passage construction between the compressor and combustion chamber said passage adds materially to the overall engine length. In the gas turbine engine illustrated, however, the corresponding diffuser passage between the outlet 94 of the high pressure compressor 22 and the combustion 24 is of relatively short axial length thereby effecting a further reduction in engine length. For this purpose, the outer and inner walls of the passage 18 each turn abruptly substantially at a right angle and away from the other at a point downstream of and adjacent to the last blade stage of the compressor 22, as indicated at 96 and 98. In addition, the upstream wall 100 of the combustion chamber 24 is an annular wall which is disposed transversely across the annular compressor outlet 94 a short distance downstream of the annular radially extending walls 96 and 98 to form annular passages 102 and 104 extending radially outwardly and inwardly respectively from the compressor outlet 94.

The annular wall 100 is disposed sufficiently close to the radial walls 96 and 98 at the annular compressor outlet 94 and said walls are so shaped that the effective cross-sectional area of each of the annular flow paths 102 and 104 progressively increases from approximately one-half the minimum cross-sectional area of the flow path 18 at the outlet 94. In the case of the radially outward path 102, because the radius of said flow path progressively increases in a downstream direction its cross-sectional area progressively increases even through the wall 96 and the adjacent portion of the annular wall 100 are parallel as illustrated. In the case of the radially inward path 104, however, because the radius of said flow path progressively decreases its axial width must increase in a downstream direction as illustrated at 105 in order to provide for said progressive increase in its cross-sectional area.

With this construction of the combustion chamber air inlet, the air flowing from the compressor outlet 94 into the passage 102 is turned approximately 90° radially outwardly and the air flowing from said outlet 94 into the passage 104 is turned approximately 90° radially inwardly. This change in direction together with the progressive increase in the cross-sectional area of the flow paths 102 and 104 slows the air down and results in conversion of a portion of its velocity head of the air into pressure. Thus the radial passages 102 and 104 effectively function as diffuser passages even though they have but a relatively short axial length.

The annular passages 102 and 104 turn in an axial direction around the annular end wall 100 of the combustion chamber 24 and along the annular inner and outer axially extending walls 106 and 108 of the combustion chamber. Suitable openings are provided in the walls 106 and 108 for supplying secondary air to the combustion chamber 24 as is conventional. Primary air is supplied to the combustion chamber 24 through a plurality of circumferentially-spaced openings 110 in the end wall 100, said air being deflected laterally by an annular baffle 112 disposed within the chamber 24 across each said opening 110. The fuel nozzles 26 are directed in an upstream direction instead of the usual downstream direction. This results in a more complete mixing of the fuel and air in a shorter axial combustion chamber length thereby further contributing to a reduction in the engine length.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A compressor structure comprising a compressor rotor; a stator having an annular axially-directed outlet opening to which said rotor is arranged to supply compressed fluid; and a substantially-flat stationary annular member co-axially disposed across and axially spaced downstream from said compressor annular outlet and extending a substantial distance both radially outwardly and radially inwardly of said outlet, said stator having a first annular wall portion extending radially outwardly from the outer wall of said annular outlet and axially spaced from the adjacent portion of said annular member so as to define therebetween a first annular flow path turning radially outwardly substantially 90° from said outlet opening, the walls of said first annular flow path being so spaced axially that said flow path progressively increases in cross-sectional area in a downstream direction, said stator also having a second annular wall portion extending radially inwardly from the inner wall of said annular outlet and axially spaced from the adjacent portion of said flat annular member so as to define therebetween a second annular flow path turning radially inwardly approximately 90° from said annular outlet opening, said second annular wall portion diverging in an axial direction away from said flat annular member to such an extent that said second annular flow path progressively increases in cross-sectional area in a downstream direction.

2. A compressor structure as recited in claim 1 in which said annular member is sufficiently close to said outlet so that said first and second annular flow paths each progressively increase in cross-sectional area from an area of approximately one-half the cross-sectional area of said outlet.

References Cited in the file of this patent

UNITED STATES PATENTS

| | | |
|---|---|---|
| 2,430,399 | Heppner | Nov. 4, 1947 |
| 2,503,006 | Stalker | Apr. 4, 1950 |
| 2,505,660 | Baumann | Apr. 25, 1950 |
| 2,601,000 | Nerad | June 17, 1952 |
| 2,611,532 | Ljungstrom | Sept. 23, 1952 |
| 2,655,787 | Brown | Oct. 20, 1953 |
| 2,709,894 | Oulianoff et al. | June 7, 1955 |
| 2,833,115 | Clarke et al. | May 6, 1958 |
| 2,840,989 | Macaulay | July 1, 1958 |
| 2,884,759 | Sevcik | May 5, 1959 |

FOREIGN PATENTS

| | | |
|---|---|---|
| 586,555 | Great Britain | Mar. 24, 1947 |
| 587,612 | Great Britain | Apr. 30, 1947 |
| 588,096 | Great Britain | May 4, 1947 |